United States Patent [19]

Calamari et al.

[11] Patent Number: 5,695,238
[45] Date of Patent: Dec. 9, 1997

[54] NON-METALIC ROOF FOR A WORK MACHINE

[75] Inventors: Michael A. Calamari, Raleigh; Alan A. Davidovich, Garner, both of N.C.; Thomas L. Howard, Chicago, Ill.; David G. Surridge, Knightdale, N.C.

[73] Assignee: Caterpillar Inc., Peoria, Ill.

[21] Appl. No.: 493,194

[22] Filed: Jun. 20, 1995

[51] Int. Cl.$^6$ ............................................. B62D 25/20
[52] U.S. Cl. ........................................ 296/210; 280/756
[58] Field of Search .............................. 296/210, 218, 296/190; 180/89.12; 280/756

[56] References Cited

U.S. PATENT DOCUMENTS

| | | | |
|---|---|---|---|
| 2,997,333 | 8/1961 | Kauffman et al. | 296/190 |
| 3,868,896 | 3/1975 | Doll et al. | 98/92.11 |
| 3,954,150 | 5/1976 | Cole et al. | 180/89.12 |
| 4,189,987 | 2/1980 | Amberg et al. | 98/2.14 |
| 4,355,845 | 10/1982 | Ziegler et al. | 296/210 |
| 4,721,031 | 1/1988 | Nakata et al. | 98/2.09 |
| 5,450,917 | 9/1995 | Goddard | 296/190 X |

*Primary Examiner*—David M. Mitchell
*Attorney, Agent, or Firm*—Claude F. White; Diana L. Charlton

[57] ABSTRACT

A non-metallic roof for a work machine includes a rotationally molded plastic structure which encloses and seals the top portion of an operator's station of the work machine. The roof includes grab rails and light sockets which are integrally molded into the structure. A plurality of metallic bars and cooperating threaded fasteners connect the roof to the operator's station. A closed cell foam material seals the juncture between the roof and the top portion of the operator's station.

11 Claims, 2 Drawing Sheets

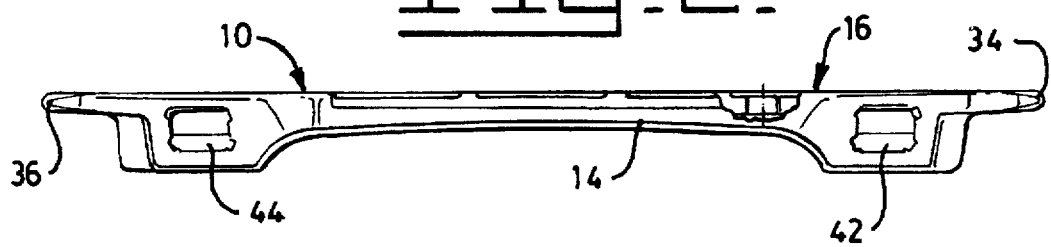
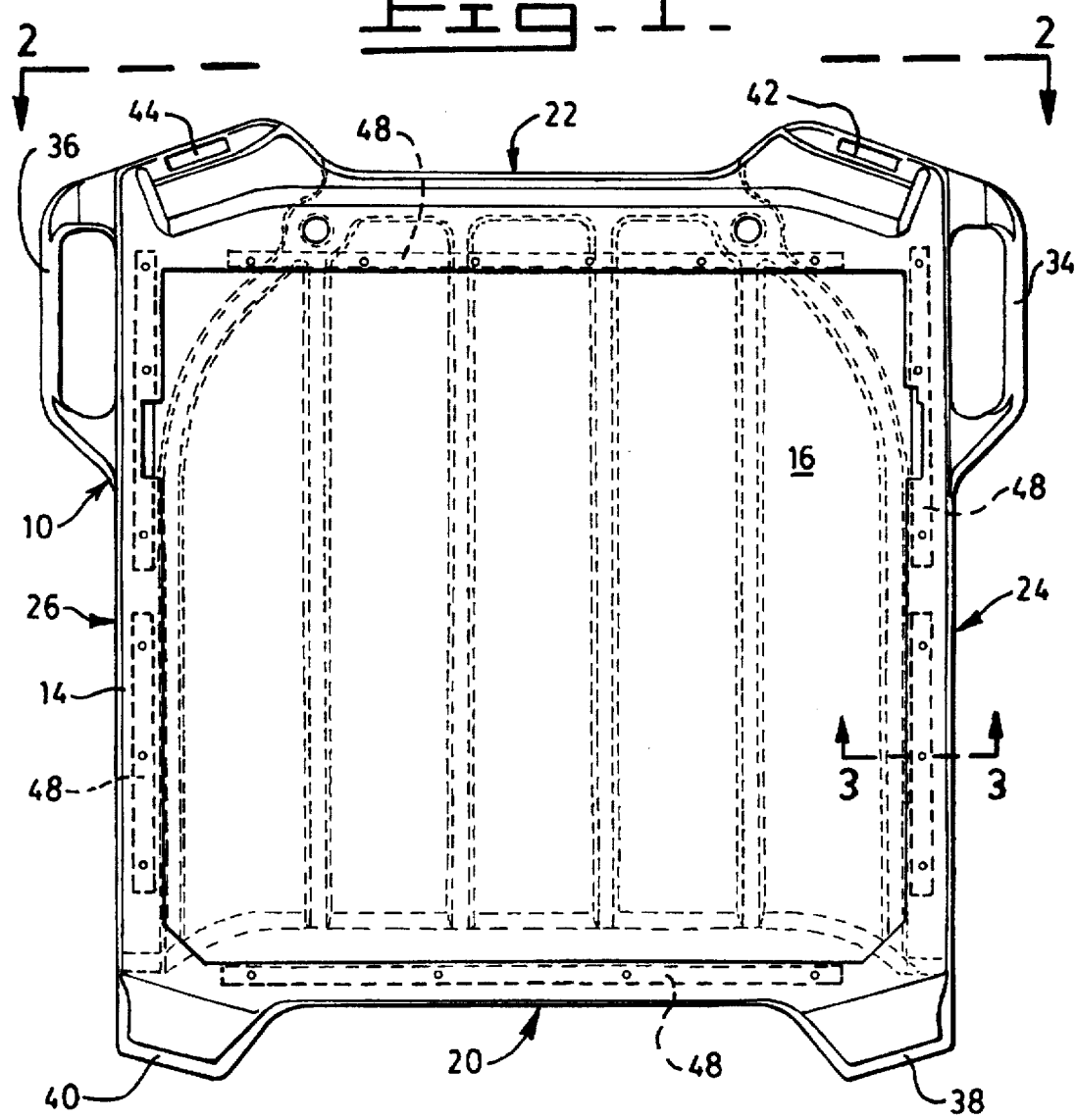

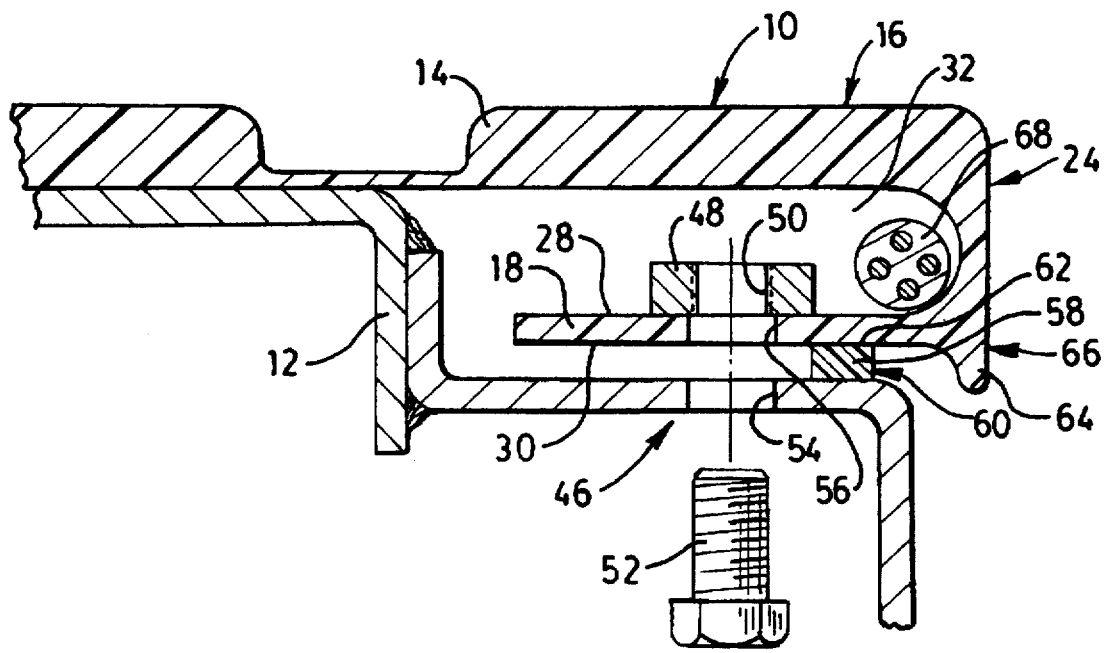
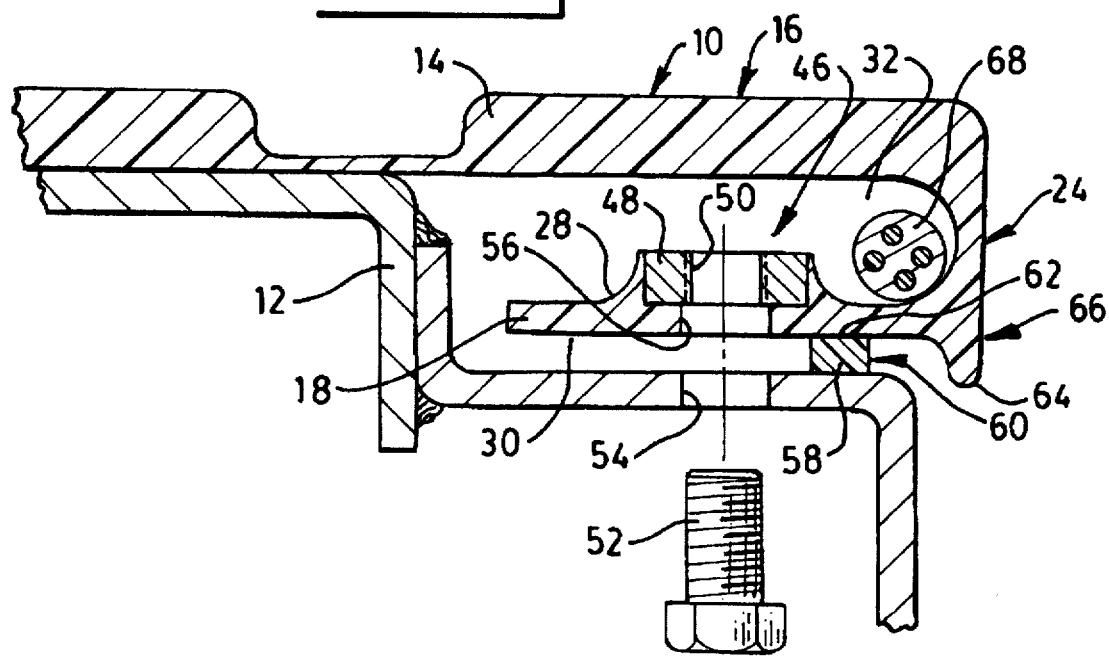

NON-METALIC ROOF FOR A WORK MACHINE

TECHNICAL FIELD

This invention relates generally to an operator's station for a work machine and more particularly to a non-metallic roof which covers and seals the operator's station.

BACKGROUND ART

Earthmoving and construction machines, such as wheel-type loaders and backhoe loaders, are often equipped with enclosed cabs or operator's stations. These cabs generally include a top enclosure which forms a portion of a structure to protect the machine operator from falling objects. However, to seal the cab, provide cab pressurization, and prevent entrance of rain and dust, a roof of some type is generally added to the top enclosure. The roof can also serve to enhance the appearance of the top enclosure. Other items are also added onto the top enclosure, such as grab rails and lights. These items are often bolted or welded to the top structure. Adding these items to the cab structure requires additional time and effort, and with respect to the lights, makes them vulnerable to damage and theft. Sealing of the roof of the cab structure presents additional problems.

The present invention is directed to overcoming one or more of the problems as set forth above.

DISCLOSURE OF THE INVENTION

In one aspect of the present invention, a non-metallic roof for the operator's station of a work machines includes a generally rectangular plastic structure having a top portion and a bottom flange portion. The plastic structure has a plurality of grab rails and a plurality of light sockets integrally molded therein. The present invention further includes means for releasably connecting the roof to the operator's station.

By molding the roof of plastic, the grab rails and the light sockets can be integrally formed into the roof. This improves the appearance of the roof and saves time and effort that would be required to add these items to the roof. The lights are better protected within the roof, less susceptible to theft, and are less noticeable. The separate plastic roof allows using a different color from the cab without having to mask off and paint the roof.

BRIEF DESCRIPTION OF THE DRAWINGS

FIG. 1 is a diagrammatic bottom plan view of the subject non-metallic roof;

FIG. 2 is a diagrammatic rear elevational view, taken generally along the lines 2—2 of FIG. 1;

FIG. 3 is a diagrammatic cross-sectional view taken generally along the lines 3—3 of FIG. 1; and FIG. 4 is a diagrammatic cross-sectional view similar to FIG. 3 and showing an alternate means for connecting the roof to the cab structure.

BEST MODE FOR CARRYING OUT THE INVENTION

With reference to the drawings, a non-metallic roof assembly 10 for covering the cab or an operator's station 12 of a work machine (not shown) includes a rotational molded plastic structure 14 having a generally rectangular configuration. The structure 14 includes a top portion 16, a bottom flange portion 18, front and rear portions 20,22 and first and second side portions 24,26. The bottom flange portion 18 has first and second surfaces 28,30 and is spaced from the top portion 16 to define a cavity 32 therebetween. First and second grab rails 34,36 are integrally molded into the respective first and second side portions 24,26 of the plastic structure 14 and are positioned adjacent the rear portion 22. A plurality of light sockets 38,40 are integrally molded into the front portion 20, and another plurality of light sockets 42,44 are integrally molded into the rear portion 22 of the plastic structure 14.

A connecting means 46 for releasably connecting the roof 10 to the operator's station 12 includes a plurality of metallic bars 48 having a plurality of tapped holes 50, and a plurality of threaded fasteners 52. The operator's station 12 includes a plurality of first holes 54 and the flange portion includes a plurality of second matching holes 56. The metallic bars 48 are adapted to be positioned on the first surface 28 with the tapped holes 50 in line with the first and second holes 54,56. The threaded fasteners 52 are adapted to extend through the first and second holes 54,56 and engage the tapped holes 50 in the metallic bars 48. A resilient material, such as a closed cell foam material 58, is positioned between the second surface 30 of the flange portion 18 and the operator's station 12 and forms a seal 60 between these members as they are connected together by the connecting means 46. The closed cell foam material 58 preferably has a pressure sensitive surface 62 which bonds to the operator's station to hold the material 58 in place.

The bottom flange portion 18 is joined to the top portion 16 by the front and rear portions 20,22 and by the first and second side portions 24,26. A downwardly extending lip 64 is formed at the juncture 66 between the first and second side portions 24,26 and the flange portion 18, and also at the juncture 66 between the front and rear portions 20,24 and the flange portion 18. This downwardly extending lip functions as a drip edge to prevent water from flowing back toward the seal 60.

The cavity 32 serves to accommodate a wiring harness 68. The wiring harness 68 serves to provide electrical power to lights and other electronically operated components mounted within or to the roof 10.

With particular reference to FIG. 4, an alternate embodiment of the connecting means 46 is shown. In this embodiment, the metallic bars 48 are molded directly into the first surface 28 of the flange portion 18. This eliminates the necessity of any type of pin or stud to hold the bars 48 in place while the roof is being connected to the operator's station 12.

Industrial Applicability

With reference to the drawings, and the previous detailed description, the subject roof assembly 10 is particularly useful on earthmoving and construction machines which have enclosed operator's stations 12. The roof assembly 10 serves to provide a finished cover for the top enclosure of the operator's station 12 and to seal the operator's station 12 against rain and dust. The roof assembly also includes integrally formed grab rails 34,36 and integrally formed light sockets 38,40,42,44, and provides a protected area for a wiring harness 68.

Before the roof assembly 10 is to be connected to the operator's station 12, the closed cell foam material 58 is positioned between the operator's station and the second surface 30 of the flange portion 18. The tapped metallic bars 48 are then positioned onto the first surface 28 of the flange portion 18 and aligned with the second holes 56 by one or more threaded pins or studs. These studs hold the bars 48 in position while the roof 10 is placed onto the operator's station 12. Prior to placing the roof 10 in position, the wiring harness 68 is inserted into the cavity 32. With the roof 10 in position on the operator's station 12, the studs extend downwardly through the first holes 54 to properly position the roof assembly 10. Several threaded fasteners 52 are inserted through the first and second holes 54,56 to engage the tapped holes 50 in the bars 48. The studs are then removed and additional threaded fasteners 52 are connected to the bars 48 and tightened to connect the roof assembly to the operator's station 12. During this procedure, the closed cell foam material 58 is compressed and forms the seal 60. With the embodiment shown in FIG. 4, the studs are not necessary, since the tapped bars 48 are already positioned and aligned with the second holes 56.

Other aspects, objects, and advantages of this invention can be obtained from a study of the drawings, the disclosure, and the appended claims.

We claim:

1. A non-metallic roof for the operator's station of a work machine, comprising:

a molded plastic structure having a generally rectangular configuration, a top portion, and a bottom flange portion extending integral from said top portion and spaced therefrom to define a cavity therebetween, said flange portion having first and second surfaces;

a plurality of grab rails integrally molded into said plastic structure;

a plurality of light sockets integrally molded into said plastic structure; and means for releasably connecting said roof to the operator's station including a plurality of metallic bars positioned within said cavity in association with the first surface of said flange portion and a plurality of threaded fasteners adapted to extend through said second surface and through said operator's station and connect to said metallic bars.

2. A roof, as set forth in claim 1, wherein said plastic structure has a front portion, a rear portion, and first and second side portions, and a grab rail is associated with each of said first and second side portions adjacent said rear portion.

3. A roof, as set forth in claim 1, wherein said plastic structure has a front portion, a rear portion, and first and second side portions, and said plurality of light sockets are formed in said front portion and said rear portion.

4. A roof, as set forth in claim 3, wherein one of said plurality of grab rails is associated with each of said first and second side portions adjacent said rear portion.

5. A roof, as set forth in claim 1, wherein a wiring harness is positioned within said cavity.

6. A roof, as set forth in claim 1, including a closed cell foam material positioned between said second surface of said flange portion and the operator's station, said foam material being adapted to contact said operator's station and form a seal between said flange portion and said operator's station.

7. A roof, as set forth in claim 1, including a resilient material positioned between said flange portion and said operator's station, said material being adapted to form a seal between said flange portion and said operator's station.

8. A roof, as set forth in claim 1, wherein the plurality of metallic bars are molded into the first surface of said flange portions.

9. A roof, as set forth in claim 8, including a resilient material adapted to be positioned between said flange portion and said operator's station, said material being adapted to form a seal between said flange portion and said operator's station.

10. A roof, as set forth in claim 2, wherein said flange portion is joined to said top portion by the front and rear portions and by the first and second side portions, and a downwardly extending lip is formed at the juncture between said side portions and said flange portion, and at the juncture between said front and rear portions and said flange portion.

11. A non-metallic roof assembly for covering and sealing an operator's station of a work machine, comprising:

a rotationally molded plastic structure having a top portion, a bottom flange portion extending integral from said top portion and spaced therefrom to define a cavity therebetween, a front portion, a rear portion, and first and second side portions;

a grab rail integrally formed into each of the first and second side portions adjacent the rear portion;

a plurality of light sockets integrally formed into each of the front and rear portions;

a plurality of metallic bars supported by said flange portion and a plurality of threaded fasteners adapted to extend through said flange portion and connect to said metallic bars; and a resilient material positioned between said flange portion and said operator's station to form a seal therebetween.

* * * * *